Figure 3:
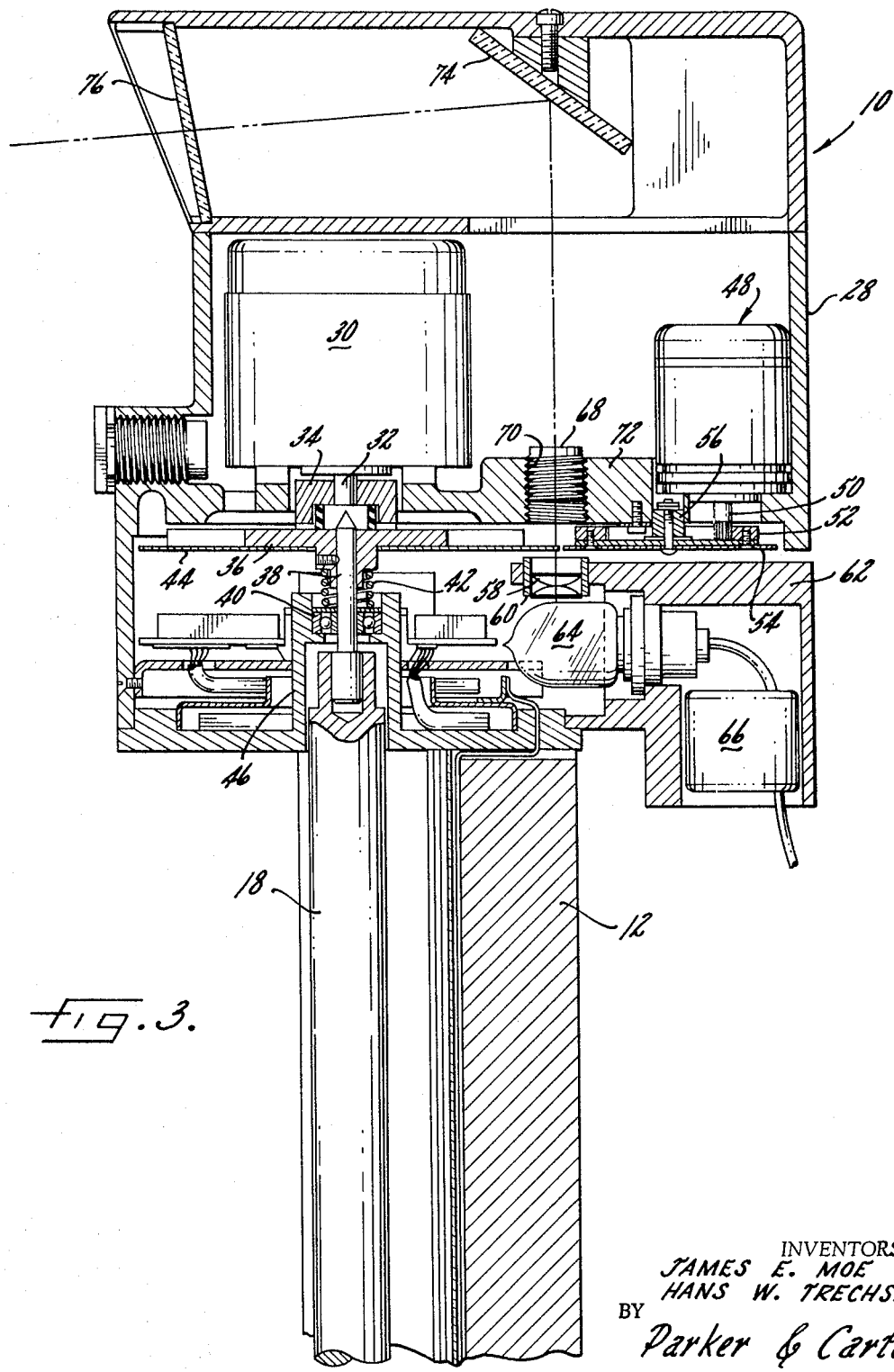

Dec. 27, 1966   J. E. MOE ETAL   3,293,759
LINEAR DISTANCE MEASURING INSTRUMENT
Filed Aug. 6, 1964   5 Sheets-Sheet 1
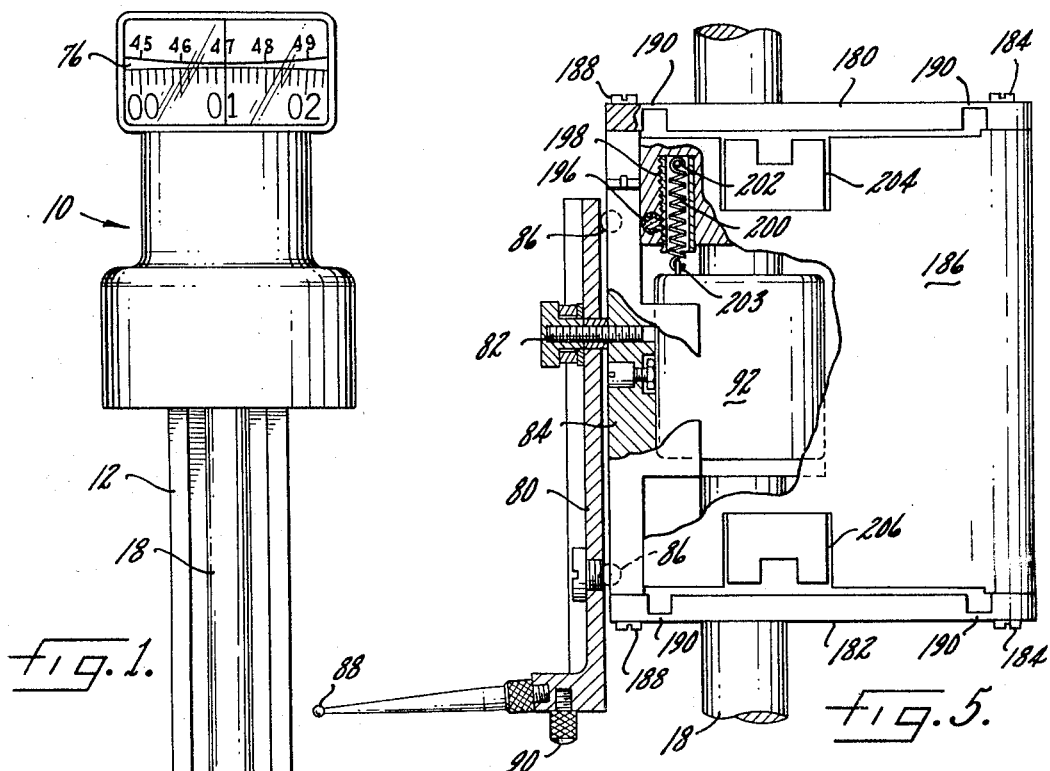
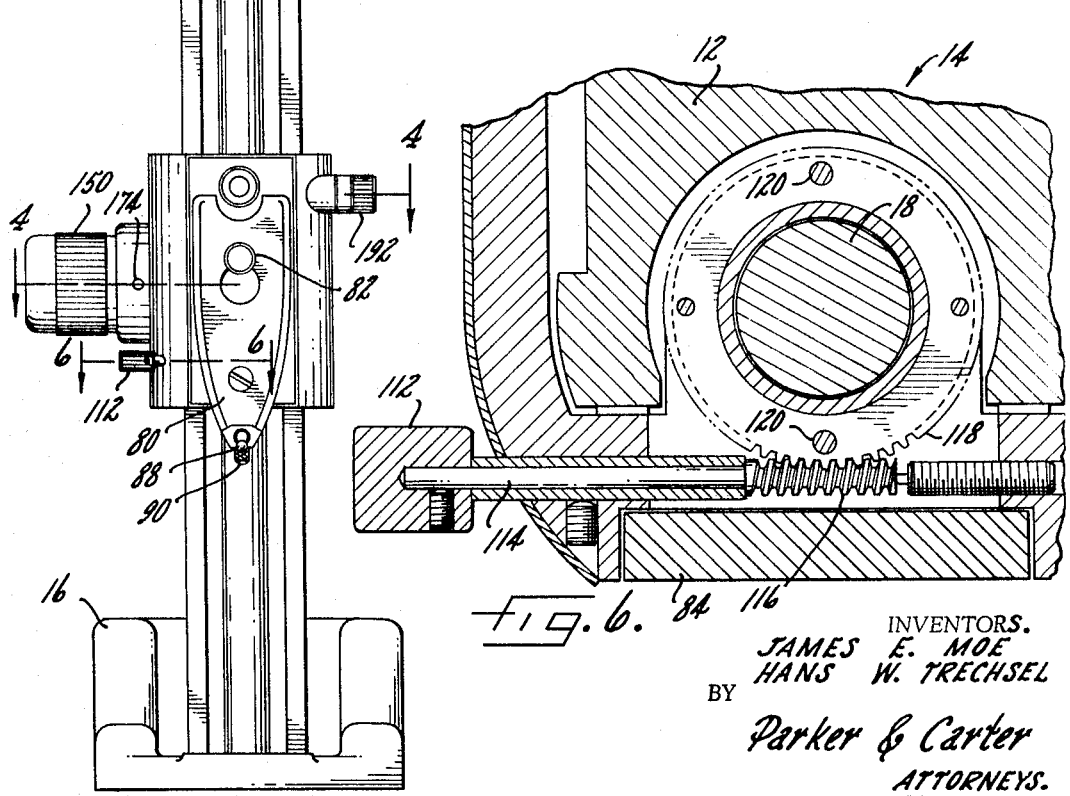
INVENTORS.
JAMES  E.  MOE
HANS  W.  TRECHSEL
BY
*Parker & Carter*
ATTORNEYS.

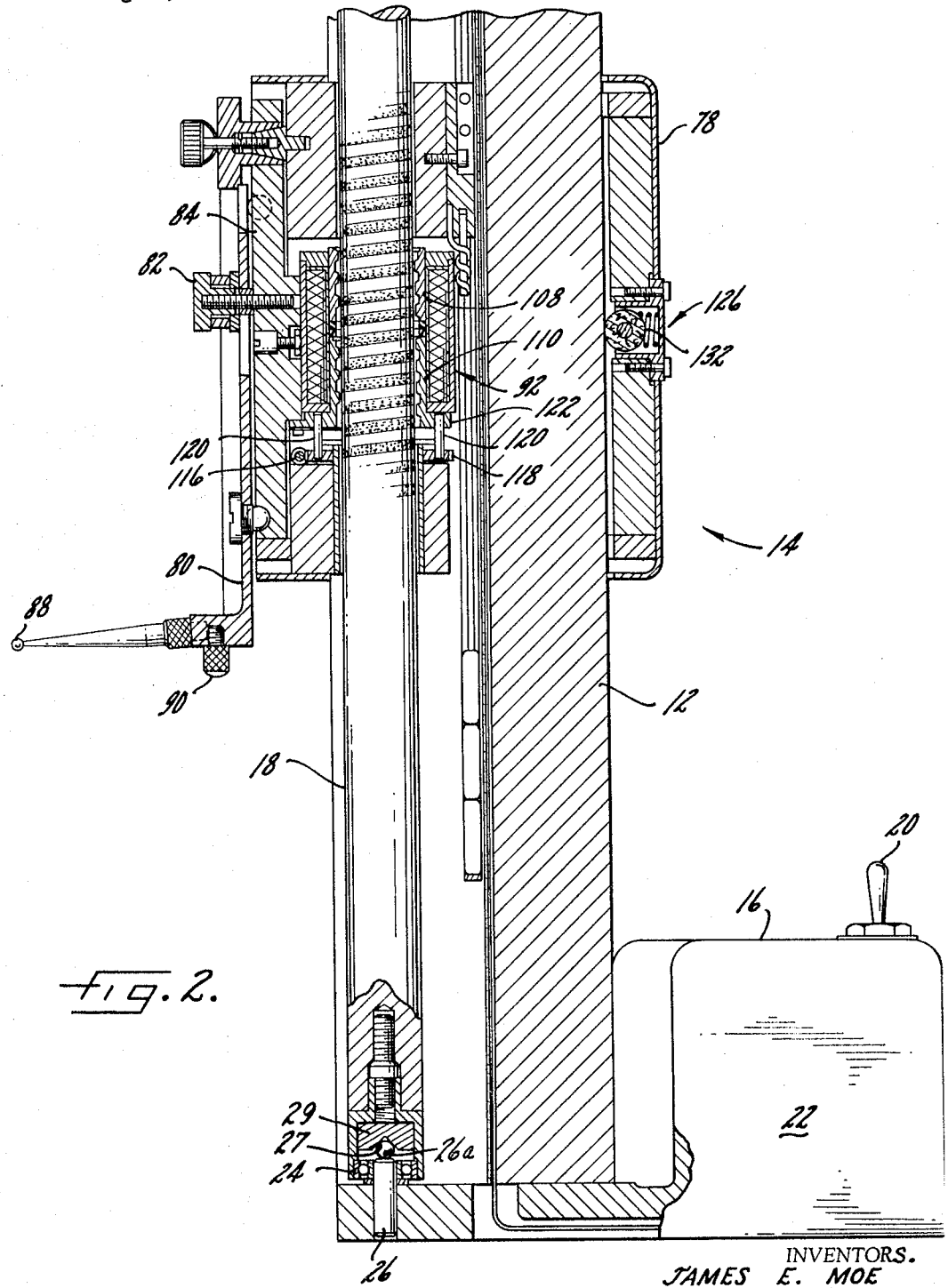

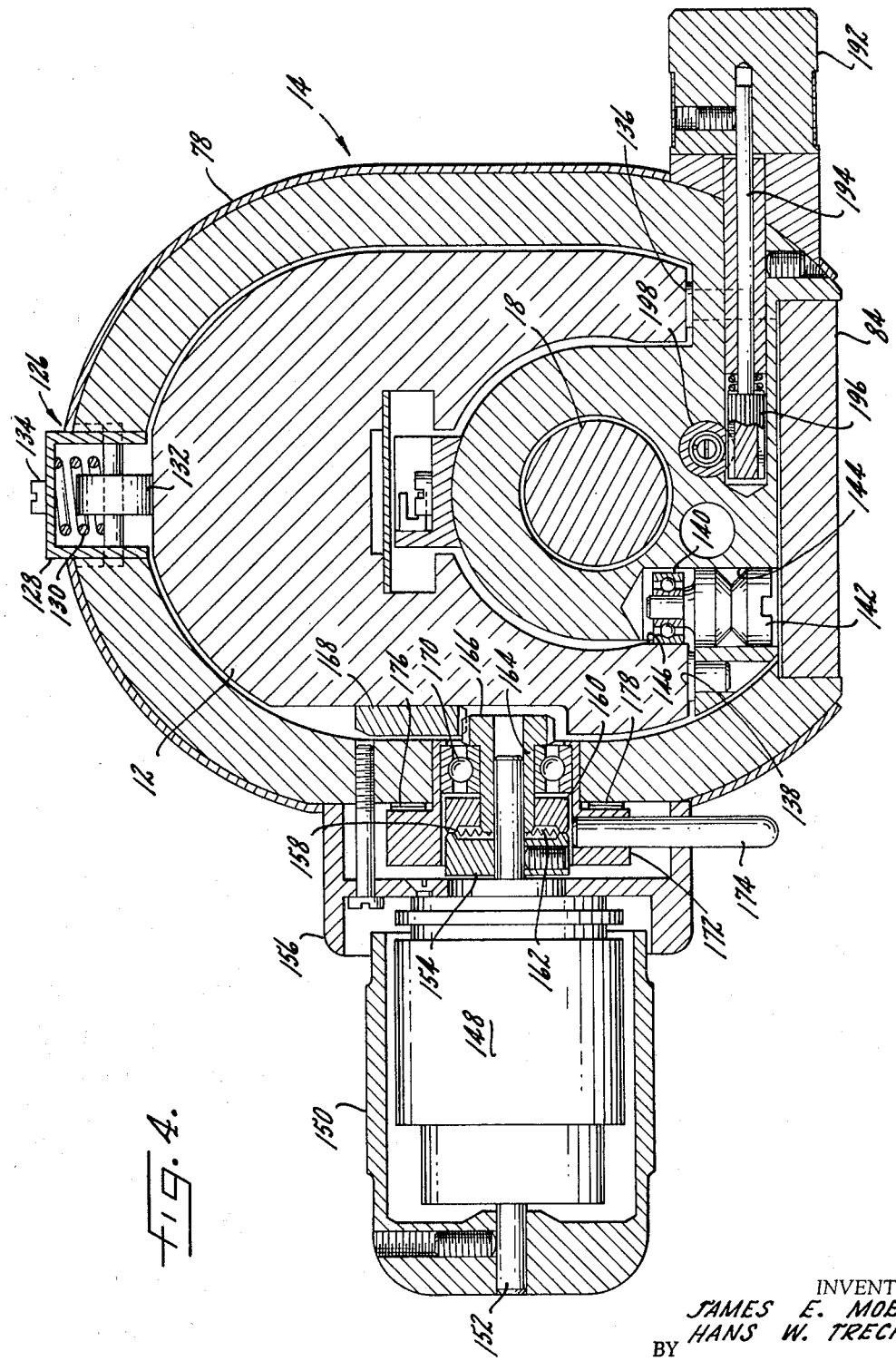

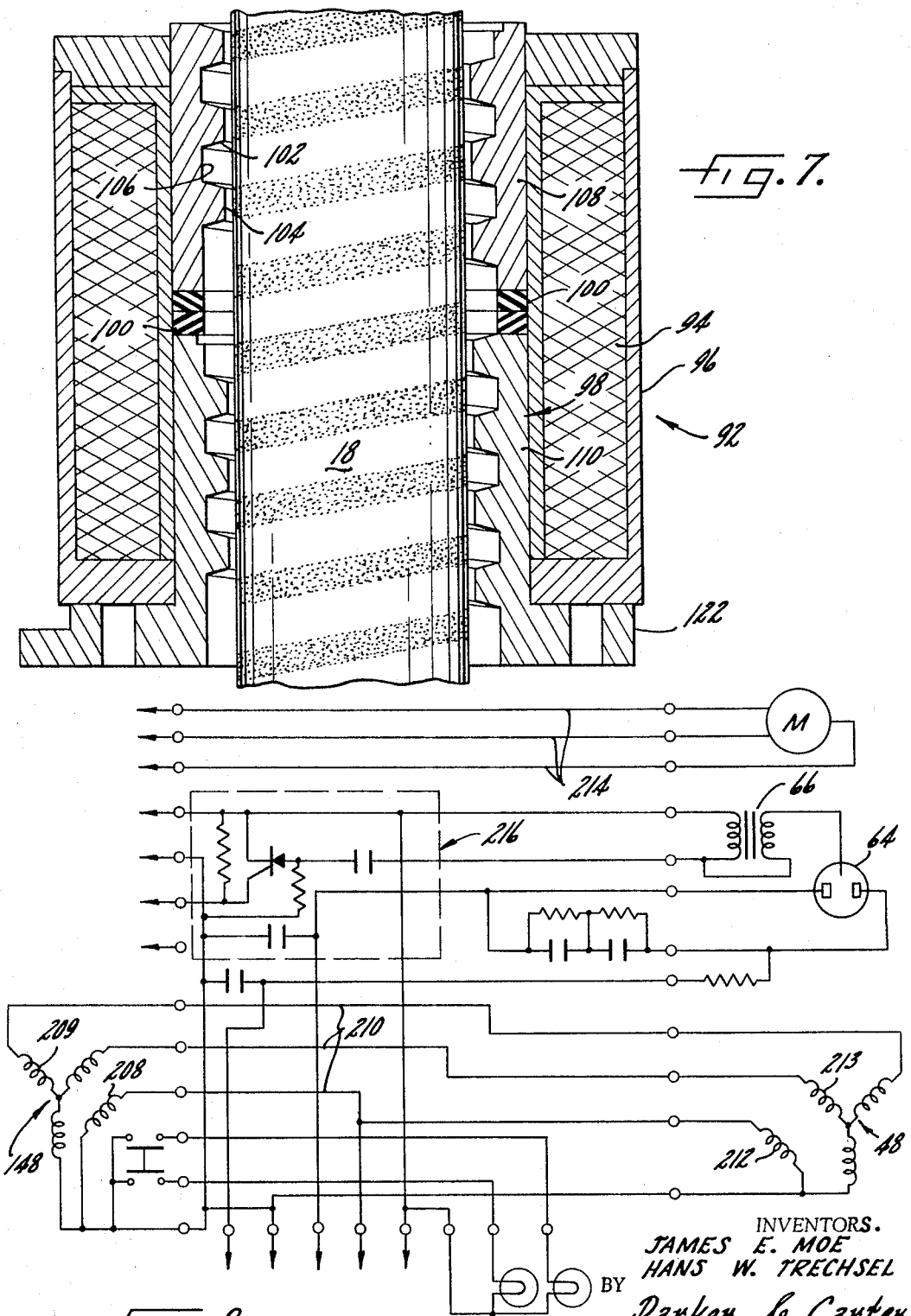

United States Patent Office 3,293,759
Patented Dec. 27, 1966

3,293,759
LINEAR DISTANCE MEASURING INSTRUMENT
James E. Moe and Hans W. Trechsel, Wayzata, Minn., assignors to Minnetech Labs, Inc., Minneapolis, Minn., a corporation of Minnesota
Filed Aug. 6, 1964, Ser. No. 387,953
17 Claims. (Cl. 33—125)

This invention relates to an instrument for measuring linear distance and in particular to such an instrument which is relatively inexpensive to manufacture, portable, and accurate to substantially more than a thousandth of an inch.

One purpose of the invention is an instrument of the type described utilizing a modulated magnetic flux pattern to indicate a distance being measured.

Another purpose is a measuring instrument of the type described having both coarse and fine readout.

Another purpose is a distance measuring instrument of the type described utilizing synchros for providing coarse measurement and the phase change of an electric signal for providing a fine measurement.

Another purpose is a linear distance measuring instrument of the type described including means for both coarse and fine adjustment of the measuring slide.

Another purpose is a finely calibrated linear distance measuring instrument of the type described including magnetic compensation for providing a linear change in gauging pressure.

Another purpose is a spring movement utilizing magnetic compensation to provide a somewhat constant pressure application at various spring positions.

Other purposes will appear in the ensuing specification, drawings and claims.

The invention is illustrated diagrammatically in the following drawings wherein:

FIGURE 1 is a front view of a measuring instrument of the type described,

FIGURE 2 is an enlarged partial side view, in part section, of the bottom half of the instrument illustrated in FIGURE 1, FIGURE 3 is an enlarged partial side view, in part section, of the top half of the instrument illustrated in FIGURE 1, FIGURE 4 is a section along plane 4—4 of FIGURE 1, FIGURE 5 is a side view, in part section, of the slide illustrating the magnetic compensation arrangement, FIGURE 6 is a section along plane 6—6 of FIGURE 1, FIGURE 7 is an enlarged section illustrating the magnetic flux circuit between the slide and the meter bar, and FIGURE 8 is a wiring diagram of the control circuit used in the instrument shown herein.

Considering FIGURE 1, the instrument may include a readout assembly indicated generally at 10, which is mounted on top of a frame or column 12. A slide 14 is movable on the column 12 and the column or frame 12 is supported by a base 16. Mounted within the confines of the somewhat U-shaped frame 12 is an elongated measuring member or meter bar 18. The meter bar 18 may have a magnetic helical thread running generally along its length from one end to the other. This may be a single-start thread or a multiple-start thread, but what is important is to have a magnetic pattern in the shape of a helical thread. For example, as shown in FIGURE 7, the darkened areas may be north poles with areas in between being south poles.

Considering FIGURE 2, the base 16 may have a switch 20 for turning the instrument on and off and may have a housing 22, with the housing 22 containing an amplifier as well as other electronic equipment. It is necessary to have only equipment which does not generate heat in the base so as to reduce any error due to heat expansion. Wires may run from the slide to the amplifier and from the amplifier to the read out assembly. The bottom of the meter bar 18 may be mounted on a bearing 24 which is held in place on the base 16 by a bearing pin 26, which is the contact point of ball 26a acting as a thrust bearing. Ball 26a may be mounted in a groove 27 of member 29. In one form of the invention the meter bar rotates at a generally constant rate and it is desirable to mount it in the manner described.

Turning to FIGURE 3, the indicating or readout assembly 10 may include a housing 28 in which is mounted a drive motor 30 for rotating the meter bar. The motor 30 may have a shaft 32 which is connected through a coupling member 34 to a disc coupling 36 with the disc coupling being fixed to a bearing pin 38 which in turn is fixed to the upper end of the meter bar 18. A bearing 40 holds the upper end of the meter bar for rotation and a spring 42 is positioned between bearing 40 and disc 36 to permit slight longitudinal movement of the meter bar. Bearing 40 and the upper end of the meter bar 18 are mounted in a somewhat cylindrical housing section 46 forming a part of assembly housing 28. The disc coupling 36 mounts a numbered or calibrated disc member 44 which rotates with the meter bar. Disc 44 is the fine indicating disc and is displayed as the lower of the two calibrated ranges illustrated in FIGURE 1.

Also mounted within the housing 28 is a synchro receiver 48 which will be described in more detail in connection with the electrical circuit. The synchro receiver 48 has an output shaft 50 formed into a pinion and in mesh with the inside of a circular gear 52 which is fixed to a coarse indicating disc 54. The indictaing disc 54 is rotatable on a bushing or the like 56.

Both the coarse and fine indicating discs rotate in paths such that their outer peripheries come close together and in alignment with a condenser lens 58 mounted in a housing 60 which in turn is fixed to a support member 62 which is a part of the housing 28. Positioned beneath the condenser lens 58 is a strobe lamp 64 which is operated by a transformer 66 also fixed in the housing 28. The transformer 66 is fired at predetermined intervals by a circuit to be described hereinafter. In axial alignment with the strobe lamp 64 and the condenser lens 58 is a projection lens 68 mounted in an opening 70 in a central support 72 forming a part of the housing 28. The projection lens 68 directs the light rays from the strobe lamp and the condenser lens which have passed through adjacent portions of the discs 44 and 54 onto a mirror 74 with the mirror in turn directing the light rays onto a projection screen or the like 76. The screen 76 is illustrated in FIGURE 1. It is particularly important to note that light from the strobe lamp will pass through adjacent portions of the discs 44 and 54 and hence will project portions of these discs onto the screen 76. Both discs are calibrated in units of measurement, one in coarse units and one in fine units. The speed of the meter bar and hence fine disc 44 is coordinated with the timing of the signal to transformer 66 which fires strobe lamp 64 to project a particular portion of disc 44 onto the screen 76. Disc 54 only moves when the shaft of synchro receiver 48 moves. Once the measuring slide has reached a given location, disc 54 will be stationary.

Slide 14 may include an outer cover 78 which encloses three sides of the slide. The front of the slide mounts a face plate 80 by means of a lock screw or the like 82. The lock screw 82 extends through plate 80 and is in threaded engagement with a support 84 which mounts the pickup assembly described hereinafter. The face plate 80 may be clamped or positioned on the support 84 by a plurality, for example three, support balls 86. Extending outwardly from the face plate 80 is a probe tip 88 for use in gauging distance. An anvil tip 90 extends downwardly from the face plate 80.

As seen in FIGURES 2 and 5, a pickup assembly indicated generally at 92 is mounted on support 84 and surrounds the meter bar 18. The pickup assembly is illustrated in detail in FIGURE 7 and includes an outer coil 94 enclosed in a housing 96 with the coil in turn surrounding a flux modulator 98. Preferably, the modulator 98 is divided into two halves by magnetic insulation 100, each of these halves having an interior 102 threaded at the same pitch as the magnetic thread on the meter bar. The interior threaded surfaces 102 have a helical crest 104 which comes closest to the meter bar with the root 106 of the thread being furthest from the meter bar. The alternate high and low surfaces 104 and 106 modulate the flux from the meter bar and constant relative rotational movement between these two elements, the meter bar and the flux modulator, will induce a cyclic signal of a constant frequency in coil 94. As long as there is no linear movement between the meter bar and the flux modulator, the signal induced in the coil will have a constant frequency. Relative linear movement between these two members will change the phase of the signal induced in the coil. It is in this manner that the flux modulator and meter bar are utilized in the generation of a signal representing movement of the slide or a distance being measured. The air spaces between adjacent thread crests 104 form areas of greater magnetic resistance than the crests themselves and as the pitch of the surface 102 is the same as the thread on the meter bar, it will be apparent that rotation at a constant speed will provide a constant frequency signal in the coil.

It should be noted that the flux modulator is divided into two sections, 108 and 110, with the threads on the two sections being 180 degrees out of phase or offset. For example, assuming the dark thread of FIGURE 7 represents north poles, the crests 104 are opposite the north poles in one half and are opposite the south poles in the other half. In this way, the flux from the meter bar will pass into section 110 through coil 94 back through section 108 and to the meter bar. All flux will pass between both sections 108 and 110 in completing the circuit between the meter bar and coil.

At times it becomes necessary to make minute or fine adjustments between the relative position of the flux modulator and the meter bar in order to "zero" the indicator. Such fine adjustments are made by turning a manual control 112 on a shaft 114 mounting worm 116 at its inner end. Note particularly FIGURE 6. Worm 116 is in mesh with a gear 118 (see FIGURE 2) which rotates about the meter bar and which mounts upwardly extending pins 120. The pins 120 are rotationally fixed to the bottom 122 of the flux modulator 98. Small adjustments between the relative rotary position of the meter bar and the flux modulator can be made to "zero" the indicator.

In an instrument of the type described it is desirable that all components be properly placed relative to each other and that the position of the slide relative to the meter bar be firm and balanced. At the rear of the slide or the side opposite face plate 80 there is a roller assembly 126, note FIGURES 2 and 4. The assembly 126 includes a cover 128 mounting a spring 130 and a roller 132. An adjustment screw 134 may vary the pressure on roller 132 through spring 130. In the front of the assembly the slide moves on at least three pads 136 and 138 which bear against the front sides of the generally U-shaped column 12 and provide the balancing force against roller 132. Bearing 140 is a part of four guide assemblies which hold the slide against sidewise movement with the other parts of the assembly being formed by an eccentric guide pin 142 which is clamped against the interior portion 144 of the slide. The bearing 140 bears against an interior surface 146 of the U-shaped column 12.

A synchro transmitter or generator 148 which generates the signal driving the synchro receiver 48 is positioned within a housing 150 which is in effect a rotating control knob for moving the slide up and down on column 12. The transmitter 148 has an output shaft 152 which is fixed to both knob 150 and to a clutch member 154. The slide housing 78 has a housing extension 156 which mounts the clutch assembly described hereinafter. The clutch member 154 has on its face a toothed surface 158 which is in engagement with a second clutch member 160 through a mating toothed surface 162. Clutch member 160 is fixed to a sleeve 164 having a pinion portion 166 which is in engagement with a rack 168 extending generally the length of column 12.

When the clutch is engaged, rotation of knob 150 is effective to raise and lower the slide on column 12 through pinion 166 and rack 168. A bearing 170 is positioned between sleeve 164 and a slideable spacer 172 mounting a release pin 174. The races of the bearing are press fitted on sleeves 164 and spacer 172. Wafer springs or the like 176 are positioned between the spacer 172 and surfaces 178 on the slide. The wafer springs 178 are effective to bear against spacer 172 which through bearing 170 holds the clutch members 154 and 160 in engagement. The clutch can be released by a pivotal pin 174 which moves against a cam surface, not shown, to compress springs 176 and release the clutch members 154 and 160. Thereafter, up and down movement of the slide will rotate sleeve 164, but will not rotate shaft 152 of the synchro. Accordingly, it is then possible to "zero" the coarse measuring disc at any particular position of the slide on the meter bar. After zeroing, pin 174 can be moved back into its original position so that the clutch for driving the synchro is once again engaged.

The slide may include upper and lower spring plates 180 and 182 illustrated in FIGURE 5, with the rear of the spring plates being attached by screws or the like 184 to the slide structure 186. The front of the spring plates 180 and 182 are attached by screws or the like 188 to the support 84. The spring plates 180 and 182 have thin reed spring areas 190 in the front and back of the plates so that the support 84 can move parallel to the slide structure 186. In effect, the reed spring areas 190, the spring plates 180 and 182, and support 84 form a structure which moves in parallelogram manner relative to slide structure 186. As the face plate 80 and the probe tip 88 are mounted on support plate 84, it is possible for the probe tip to move up and down during a gauging or measuring operation because of the parallelogram movement described above.

It is desirable to adjust the gauging pressure applied by the probe tip. A control knob 192 turns a shaft 194 having a pinion 196 at its inner end. The pinion 196 is in mesh with the outer threaded surface of a sleeve 198. A spring 200 is positioned within the sleeve 198 and the top of the spring 200 is fixed to the sleeve, as at 202. The bottom of the spring 200 is fixed to the pickup assembly 92, as at 203. Rotation of knob 192 is effective to vary the tension on spring 200 to raise and lower the coil assembly, the upport plate 84 and the probe tip 88. Pinion 196 and its shaft 194 are fixed relative to the slide structure 186 and hence rotation of shaft 194 is effective to raise and lower the assembly described including spring plates 180 and 182 and effect a change in gauging pressure.

Positioned adjacent spring plates 180 and 182 are permanent magnets 204 and 206. The magnets 204 and 206, which may be single or double shoe magnets with both north and south poles, will provide magnetic compensation for the reed spring areas 190 and their spring forces with the result that at any particular setting of gauging pressure by shaft 194 and spring 200, the pressure applied by the probe tip will remain relatively constant even with the slight up and down movement of the probe tip.

The attraction forces of the two magnets are acting upon the reed springs or spring plates to draw the plates toward the magnets. The forces of the spring areas act in the opposite manner. The magnetic forces decrease as the spring plates move away while the spring forces increase. If a graph of the spring constants or the spring forces from the spring areas 190 is plotted, in conjunction with a plot of the forces from spring 200 and the forces from the magnets, and if proper values are given to all of these elements, it can be shown that the magnetic compensation provided by permanent magnets 204 and 206 will provide a generally constant gauging pressure at any setting of spring 200, but yet a linearly variable pressure with changes in the tension on spring 200. Such a form of magnetic compensation is highly desirable in the present application as well as in other applications.

FIGURE 8 illustrates the electrical circuit for operating the measuring instrument. The synchro transmitter 148 has a moveable coil 208 which is attached to rotatable shaft 152, and stationary coils 209. When the position of coil 208 changes relative to coils 209 in the synchro, a signal is transmitted through wires 210 to the receiving coil 212 of receiving synchro 48. The signal passed through coil 212 will cause it to move until it assumes the same relative position to its three associated coils 213 as coil 208 is to its associated coils 209. Accordingly, any relative change in position of coil 208 indicating a movement of the slide will be transferred to coil 212 to cause a corresponding movement of coarse indicating disc 54.

Motor 30 is indicated in FIGURE 8 and is driven from a conventional supply through lines 214. The strobe lamp 64 is fed from trigger transformer 66 with the trigger transformer being supplied through a gated rectifier circuit indicated generally at 216. The gated rectifier circuit receives its signal from the amplifier positioned within section 22 of the base 16. The amplifier in turn receives its signal from coil 94 surrounding the flux modulator. As long as the signal being induced in the coil by the flux modulator and meter bar has a constant frequency and phase, the trigger transformer will supply a trigger to ignite the strobe at equally spaced time intervals. This light will then illuminate the indicating discs 44 and 45. Any relative linear or up-and-down movement between the meter bar and the flux modulator will change the phase of the signal induced in the coil which in turn will change the time at which the trigger transformer supplies a firing trigger to the strobe. This in turn will illuminate a different portion of the indicating disc to indicate a change in distance or movement.

The use, operation and function of the invention are as follows:

The instrument described herein may be used in measuring the height of objects, the length of objects or it may be used in any type of linear measurement. The measurement is accomplished by determining the distance from a "zero" point to a particular position of the slide after it has moved to one end of the object being measured. Each measurement has two components, a coarse indication and a fine indication, which together give the distance being measured to an accuracy of greater than a ten-thousandth of an inch. The coarse indication is provided by a synchro transmitter and a synchro receiver. The synchro transmitter is positioned on a slide with the position of the synchro transmitter's movable coil relative to its stationary coils being utilized to change the position of a movable coil in the synchro receiver relative to its stationary coils. Movement of the coil in the synchro receiver is effective to move the coarse indicating disc. A portion of the coarse indicating disc is illuminated by a strobe lamp so that the coarse indication can be displayed on a visual screen.

Fine measurement is accomplished by the use of a meter bar having a magnetic thread helically formed along its length and a flux modulator having helical flux modulating surfaces concentric with the meter bar. Either the meter bar or the flux modulator may be rotated as what is important is to provide relative rotation at a generally constant rate between the two members. When the magnetic thread on the meter bar and the thread on the magnetic flux modulating areas have the same pitch, which is the preferred form of the invention, and there is no relative linear or longitudinal movement between these two elements, a constant frequency signal will be induced in the pickup coil as long as there is constant relative rotational movement between the meter bar and the flux modulator. The magnetic thread on the meter bar forms alternate north and south poles and the flux from these alternate north and south poles is cut by the flux modulator. Preferably the flux modulator is formed into two isolated sections so that the complete magnetic flux passes through the pickup coil.

The signal induced in the pickup coil is transferred to an amplifier. The amplifier amplifies the signal from the coil and feeds it to a circuit forming a trigger pulse to fire the strobe lamp. As long as a constant frequency signal is being induced in the pickup coil the trigger pulses supplied to the strobe lamp will be at equally spaced timed intervals. Relative linear movement or longitudinal movement between the flux modulator and the meter bar will cause a phase change in the signal induced in the coil. Such a phase change will vary the time at which the strobe lamp is fired.

The strobe lamp is arranged to illuminate a given portion of the fine indicating disc. However, when the firing time of the strobe lamp varies, the portion of the indicating disc which is illuminated will vary in relation to the pickup coil. A change in the time at which the strobe fires will then change the particular number or group of numbers which are illuminated by the strobe lamp on the fine indicating disc. By the use of a magnetic circuit of the type described, it is possible to have extremely fine and accurate measurements. The firing of the strobe lamp is precisely controlled by the phase of the signal induced in the pickup coil.

The fine indicating reading can be zeroed by making minute adjustments to the rotary position of the flux modulator relative to the meter bar at a stationary linear position of the slide. By rotating the flux modulator the same effect would be attained as if the flux modulator were moved longitudinally. A suitable pinion and gear arrangement is used to provide any multiple of 360° rotation between the meter bar and the flux modulator other than that provided by the meter bar drive.

It is also desirable to provide zeroing for the coarse indicating disc. Such an arrangement is accomplished by releasing the clutch which normally couples the coarse synchro transmitter to its pinion which in turn is in mesh with a rack on the column supporting the meter bar. Normally, up-and-down movement of the slide on the meter bar is effective to rotate the movable coil of the synchro transmitter. By releasing the coupling the slide may be moved up and down without any change in the angular position of the synchro transmitter's movable coil or the synchro transmitter's coil may be positioned without moving the slide. Once a particular desired location has been reached, the coupling between the synchro transmitter and the pinion can once again be closed.

It is also advantageous to adjust the gauging pressure applied by the probe tip. Too strong a gauging pressure, particularly in certain materials, can give an inaccurate reading. The probe tip is suspended on a spring system having magnetic compensation. The magnetic compensation provides linear adjustment of the gauging pressure of the probe tip as well as relatively constant gauging pressure at any particular setting of the spring system.

The invention should not be limited to the use of a rotating meter bar and a relatively stationary pickup element or scanning element or flux modulator. In some applications it may be desirable to rotate the flux modulator and have the meter bar stationary. Similarly, the invention should not be limited to the use of synchro transmitters for the coarse indication as other means may be equally satisfactory.

Whereas the preferred form of the invention has been shown and described herein, it should be realized that there are many modifications, substitutions and alterations thereto within the scope of the following claims.

We claim:

1. In a device for measuring linear distance, an elongated member having areas of different magnetic flux density arranged in a predetermined pattern along its length, means movable linearly relative to said elongated member for use in measuring a linear distance, means cooperating with the magnetic pattern on said elongated member and carried by said movable means for generating an electric signal which represents a distance through which said movable means has moved, means carried by said movable means for generating a second electric signal which represents a distance through which said movable means has moved, and means for utilizing said electric signals to provide a visual indication, one signal providing a coarse indication and the other signal providing a fine indication, of the distance measured in units of measurement, further characterized in that the means for generating a signal for use in providing a coarse indication includes a synchro transmitter mounted on said movable means, a synchro receiver fixed to the means for utilizing said electric signals for providing a visual indication, and an electric connection between said transmitter and receiver.

2. The structure of claim 1 further characterized in that the means for utilizing the electric signals to provide a visual indication of the distance measured include rotatable discs, one for the fine indication and one for the coarse indication, said rotatable discs being calibrated in units of measurement.

3. The structure of claim 2 further characterized in that the rotatable disc for providing a coarse indication is driven by said synchro receiver.

4. In a device for measuring linear distance, an elongated member having areas of different magnetic flux density arranged in a predetermined pattern along its length, means movable linearly relative to said elongated member for use in measuring a linear distance, means cooperating with the magnetic pattern on said elongated member and carried by said movable means for generating an electric signal, a variable of which represents a distance through which said movable means has moved, and means utilizing the electric signal to provide a visual indication of the distance measured in units of measurement including a rotatable disc calibrated in units of measurement and driven at a rate related to a variable of the electric signal, and means for illuminating a defined area of said disc, said illuminating means operating periodically and at a time determined by a variable of said electric signal, further characterized by and including means for driving said elongated member at a generally constant rate to rotate it about its longitudinal axis, said disc being driven by said same driving means and at the same rate as the elongated member.

5. The structure of claim 4 further characterized in that the means cooperating with the magnetic pattern on said elongated member for generating an electric signal, generates an electric signal of a generally constant frequency, linear movement of the means movable relative to the elongated member being effective to change the phase of said electric signal, said electric signal being utilized to operate said illuminating means.

6. In a device for measuring linear distance, a meter bar having areas of different magnetic flux density arranged in a predetermined pattern along its length, a frame for supporting said meter bar, a base for said frame, a slide movable linearly on the frame for use in measuring a linear distance, a rack extending along said frame, a pinion in engagement with said rack and mounted on said slide, means on the slide for rotating the pinion to move the slide relative to the frame and meter bar, means, carried by the slide, and rotatable relative to the meter bar for cooperating with the magnetic pattern on the meter bar in generating an electric signal, a variable of which represents a distance through which said slide has moved, and indicating means mounted on the frame for utilizing the electric signal to provide a visual representation of the distance measured in units of measurement.

7. The structure of claim 6 further characterized by and including a motor mounted on said frame for rotating said meter bar, the areas of different magnetic flux density on said meter bar being arranged in a helical pattern.

8. The structure of claim 6 further characterized by and including a feeler member on said slide for use in measuring a distance.

9. The structure of claim 6 further characterized by and including a synchro transmitter on said slide and a synchro receiver on said frame, said synchro transmitter and synchro receiver each having a rotatable coil, wires connecting said transmitter and receiver, said transmitter and receiver being utilized to provide a coarse indication of the distance being measured, rotation of said pinion being effective to rotate the coil of said transmitter.

10. The structure of claim 9 further characterized by and including release means on the slide for permitting movement of the slide relative to the frame and meter bar without moving the rotatable coil of the transmitter.

11. The structure of claim 10 further characterized in that said synchro transmitter has a shaft, said shaft being operably connected to the means on the slide for rotating the pinion, said release means being effective to disengage said shaft from the pinion whereby said pinion is moved relative to the rack without rotating the shaft and rotatable coil of the transmitter.

12. The structure of claim 6 further characterized by and including a gauging member on said slide, and means for varying the pressure applied by said gauging member.

13. The structure of claim 12 further characterized by and including compensating means for applying generally the same gauging pressure at any position of the means for varying the gauging pressure.

14. The structure of claim 13 further characterized in that the means for varying gauging pressure includes spring means mounting said gauging element to said slide, said compensating means including magnets positioned adjacent said spring means.

15. The structure of claim 14 further characterized in that said spring means includes spaced plates having thin spring areas, one end of each of said plates being fixed to said slide, the other end of said plates mounting said gauging member, and an adjustable spring connected to one of said plates and said gauging member.

16. The structure of claim 15 further characterized by a pair of magnets, each positioned adjacent one of said plates.

17. The structure of claim 15 further characterized in that said adjustable spring is a coil spring, and means for varying the tension on said coil spring.

References Cited by the Examiner
UNITED STATES PATENTS

| | | | |
|---|---|---|---|
| 2,611,964 | 9/1952 | Buisson | 33—125 X |
| 2,628,539 | 2/1953 | Neergaard | 33—125 X |
| 2,913,662 | 11/1959 | Hogan | 324—70 |
| 3,083,324 | 3/1963 | Wolff | 324—87 |
| 3,184,858 | 5/1965 | Shaper | 33—172 |

FOREIGN PATENTS

| | | |
|---|---|---|
| 550,235 | 8/1956 | Belgium. |
| 827,069 | 2/1960 | Great Britain. |
| 859,267 | 1/1961 | Great Britain. |
| 872,152 | 7/1961 | Great Britain. |
| 543,443 | 5/1956 | Italy. |

ROBERT B. HULL, *Primary Examiner.*

ISAAC LISANN, *Examiner.*

B. A. DONAHUE, *Assistant Examiner.*